United States Patent
Hu et al.

(10) Patent No.: US 12,185,332 B2
(45) Date of Patent: Dec. 31, 2024

(54) MONITORING CONTROL CHANNELS USING DYNAMIC DOWNLINK CONTROL INFORMATION

(71) Applicant: ZTE CORPORATION, Guangdong (CN)

(72) Inventors: Youjun Hu, Shenzhen (CN); Bo Dai, Shenzhen (CN); Huiying Fang, Shenzhen (CN); Luanjian Bian, Shenzhen (CN); Weiwei Yang, Shenzhen (CN); Kun Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 367 days.

(21) Appl. No.: 17/852,248

(22) Filed: Jun. 28, 2022

(65) Prior Publication Data

US 2022/0386285 A1 Dec. 1, 2022

Related U.S. Application Data (63) Continuation of application No. PCT/CN2020/107652, filed on Aug. 7, 2020.

(51) Int. Cl.
*H04W 72/23* (2023.01)

(52) U.S. Cl.
CPC .................. *H04W 72/23* (2023.01)

(58) Field of Classification Search
CPC ............ H04W 72/23; H04W 52/0229; H04L 1/0045; H04L 1/0072; H04L 1/0075; H04L 5/0053; H04L 5/0094; Y02D 30/70
See application file for complete search history.

(56) References Cited

U.S. PATENT DOCUMENTS

| | | | |
|---|---|---|---|
| 10,271,321 B1 | 4/2019 | Patel et al. | |
| 2019/0223164 A1 | 7/2019 | He et al. | |
| 2019/0386769 A1 | 12/2019 | Liu et al. | |
| 2020/0145984 A1 | 5/2020 | Hosseini et al. | |

(Continued)

FOREIGN PATENT DOCUMENTS

| | | |
|---|---|---|
| CN | 110100405 A | 8/2019 |
| CN | 110475323 A | 11/2019 |

(Continued)

OTHER PUBLICATIONS

First Office Action and Search Report for CN App. No. 202080104130.3 dated Apr. 16, 2024 (with English translation, 19 pages).

(Continued)

*Primary Examiner* — Cheikh T Ndiaye
(74) *Attorney, Agent, or Firm* — Foley & Lardner LLP (57) ABSTRACT

Presented are systems, methods, apparatuses, or computer-readable media for monitoring control channels using dynamic downlink control information. A wireless communication device may receive, from a wireless communication node, a higher layer configuration. The wireless communication device may receive, from the wireless communication node, downlink control information (DCI) configured to trigger upper limits for physical downlink control channel (PDCCH) monitoring. In some embodiments, the wireless communication device may decode at least one PDDCH in at least one slot according to the upper limits.

19 Claims, 3 Drawing Sheets

(56) References Cited

U.S. PATENT DOCUMENTS

| | | | |
|---|---|---|---|
| 2020/0154413 A1 | 5/2020 | Hosseini et al. | |
| 2021/0014837 A1* | 1/2021 | Papasakellariou | H04W 72/23 |
| 2021/0352501 A1* | 11/2021 | Taherzadeh Boroujeni | ............... H04W 72/0446 |

FOREIGN PATENT DOCUMENTS

| | | | |
|---|---|---|---|
| CN | 111357389 A | 6/2020 | |
| WO | WO-2015/082096 A1 | 6/2015 | |
| WO | WO-2018/097680 A1 | 5/2018 | |
| WO | WO-2019182423 A1 * | 9/2019 | .......... H04J 11/0086 |
| WO | WO-2020/015723 A1 | 1/2020 | |
| WO | WO-2020/055212 A1 | 3/2020 | |
| WO | WO-2020/141815 A1 | 7/2020 | |

OTHER PUBLICATIONS

Intel Corporation: "On PDCCH enhancements for eURLLC" 1 3GPP TSG RAN WG1 #97; R1-1906806; May 17, 2019; Reno, USA (11 pages).

International Search Report and Written Opinion for PCT Appl. No. PCT/CN2020/107652, mailed May 8, 2021 (9 pages).

ZTE: "On PDCCH enhancements for NR URLLC" 3GPP TSG RAN WG1 #98bis; R1-1910100; Oct. 20, 2019; Chongqing, China (15 pages).

Huawei, Hisilicon, "Other considerations on UE power saving," 3GPP TSG RAN WG1 Meeting #98bis; R1-1910079; Oct. 14-20, 2019; Chongqing, China (10 pages).

Interdigital Inc., "On Potential PDCCH Enhancements for URLLC," 3GPP TSG RAN WG1 Ad-Hoc Meeting 1901; R1-1900803; Jan. 21-25, 2019; Taipei, Taiwan (12 pages).

Notice of Reasons for Rejection on JP 2022-540394 dated Aug. 30, 2023 (with English translation, 8 pages).

ZTE, "On PDCCH enhancements for NR URLLC," 3GPP TSG RAN WG1 #98bis; R1-1910100; Oct. 14-20, 2019; Chongqing, China (15 pages).

CMCC: "Discussion on PDCCH monitoring reduction for reduced capability NR," 3GPP TSG RAN WG1 #101, e-Meeting, R1-2003967, May 25-Jun. 5, 2020 (3 pages).

Extended European Search Report on EP Appl. No. 20948122.5 dated Mar. 6, 2023.

Rapporteur (Ericsson): "Email discussion for Study on support of reduced capability NR devices (Appendix 1: Questionnaire)" 3GPP TSG-RAN WG1 Meeting #101-e, e-Meeting, Tdoc R1-2004731, May 25-Jun. 5, 2020 (61 pages).

* cited by examiner

MONITORING CONTROL CHANNELS USING DYNAMIC DOWNLINK CONTROL INFORMATION

CROSS-REFERENCE TO RELATED APPLICATION

This application claims the benefit of priority under 35 U.S.C. § 120 as a continuation of PCT Patent Application No. PCT/CN2020/107652, filed on Aug. 7, 2020, the disclosure of which is incorporated herein by reference in its entirety.

TECHNICAL FIELD

The disclosure relates generally to wireless communications, including but not limited to systems and methods for monitoring control channels using dynamic downlink control information (DCI).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A wireless communication device may receive, from a wireless communication node, a higher layer configuration. The wireless communication device may receive, from the wireless communication node, downlink control information (DCI) configured to trigger upper limits for physical downlink control channel (PDCCH) monitoring. In some embodiments, the wireless communication device may decode at least one PDDCH in at least one slot according to the upper limits.

In some embodiments, the upper limits for PDCCH monitoring may include a maximum number of PDCCH candidates to be monitored in one or more slots (M-PDDCH) or a maximum number of non-overlapping control channel elements (CCEs) in one or more slots (M-CCE. In some embodiments, the upper limits may include legacy limits; non-legacy limits; having the M-PDDCH set to 0; or having the M-CCE set to 0. In some embodiments, the trigger the upper limits includes to indicate the upper limits.

In some embodiments, the DCI is configured to trigger the upper limits via at least one of: the DCI having a new or defined DCI format, the DCI being scrambled by a configured scheduling radio network temporary identifier (CS-RNTI), a downlink (DL) semi-persistent scheduling (SPS) assignment PDCCH or a configured uplink (UL) grant Type 2 PDCCH; the DCI being scrambled by a defined RNTI, the DCI being a DCI for a group of wireless communication devices that includes the wireless communication device; N bits in the DCI, where N is greater than or equal to 1; a field in the DCI; the DCI being a defined DCI, or receipt of any DCI. In some embodiments, the N bits may indicate one or more legacy limits, or one or more non-legacy limits.

In some embodiments, the wireless communication device is configured to be triggered by the DCI on the upper limits, according to the higher layer configuration of a parameter, or the parameter enabling a feature associated with the upper limits. In some embodiments, the upper limits may include one or more values for the M-PDDCH or the M-CCE for each subcarrier spacing (SCS); or a range of values for the M-PDDCH or the M-CCE for each SCS.

In some embodiments, the wireless communication device may determine a starting location to apply the upper limits, according to an application delay or a location of a slot of the DCI configured to trigger the upper limits. In some embodiments, the wireless communication device may decode the at least one PDDCH, after a time duration corresponding to the application delay, or after the slot of the DCI with the application delay being equal to zero time unit or absent. In some embodiments, the wireless communication device may determine the application delay according to at least one of: parameters of the higher layer configuration, defined parameters, a numerology of at least one of a physical downlink shared channel (PDSCH) or a PDCCH, or a bandwidth part (BWP).

In some embodiments, the wireless communication device may decode at least one PDDCH in the at least one slot according to the upper limits, within a time duration corresponding to a limit duration. In some embodiments, the wireless communication device may determine the limit duration according to at least one of: a defined timer, a defined value, the higher layer configuration, an indication of the DCI, a defined duration relative to one or more channels, or a discontinuous reception (DRX) configuration.

In some embodiments, the upper limits is triggered or indicated via at least one of: one or more states in a field of the DCI or a medium access control control element (MAC CE); one or more bits of the DCI or the MAC CE; expiration of the limit duration; end of a physical downlink shared channel (PDSCH) or an associated acknowledgement or acknowledgement (ACK/NACK); the DCI being a DCI for a group of wireless communication devices, or being a DCI for the wireless communication device; expiration of a timer; a defined DCI format; the DCI being scrambled by a configured scheduling radio network temporary identifier (CS-RNTI); a downlink (DL) semi-persistent scheduling (SPS) assignment PDCCH or a configured uplink (UL) grant Type 2 PDCCH; the DCI being scrambled by a defined radio network temporary identifier (RNTI); a defined aggregation level (AL), or a defined condition.

In some embodiments, the wireless communication device may determine an aggregation level (AL) and corresponding PDCCH candidates for a target search space (SS). In some embodiments, the wireless communication device may determine the target SS according to the higher layer configuration, an indication of the DCI, or defined setting. In some embodiments, the wireless communication device may determine by the wireless communication device, the AL and the corresponding PDCCH candidates for the target SS, from a plurality of selections, according to: an indication in the DCI; a radio resource control (RRC) signaling; a baseline AL; the higher layer configuration, or a defined setting.

In some embodiments, determining the AL and the corresponding PDCCH candidates for the target SS may include determining: one AL; at least two ALs; one AL and candidates corresponding to the one AL; or at least two ALs and candidates corresponding to the two ALs. In some embodiments, according to detecting the DCI with an aggregation level (AL) set in a first slot, the wireless communication device may determine, with the AL set, an aggregation level of a second slot. In some embodiments, responsive to the wireless communication device decoding a first slot and monitoring the first slot with a number of DCI size types or DCI formats, the wireless communication device may determine, in relation to the number of DCI size types or DCI formats, an aggregation level or upper limits of a second slot.

In some embodiments, the limit duration may be defined according to a number of slots, millisecond, PDCCH monitoring occasions, or PDCCH monitoring occasions for a search space (SS), or according to a timer. In some embodiments, the upper limit may include: a limit for PDCCH skipping or muting, a limit for search space, or a limit for control resource set.

At least one aspect is directed to a system, a method, an apparatus, or a computer-readable medium. A wireless communication node may send, to a wireless communication device, a higher layer configuration. The wireless communication node may send to the wireless communication device, downlink control information (DCI) configured to trigger upper limits for physical downlink control channel (PDCCH) monitoring. The wireless communication device may be caused to decode at least one PDDCH in at least one slot according to the upper limits.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
|---------|-----------|
| 3GPP | 3rd Generation Partnership Project |
| 5G | 5th Generation Mobile Networks |
| 5G-AN | 5G Access Network |
| 5G gNB | Next Generation NodeB |
| BWP | Bandwidth Part |
| CCE | Control Channel Element |
| CE | Control Element |
| CG | Configured Grant |
| CN | Core Network |
| CORESET | Control Resource Set |
| CSI-RS | Channel State Information, Reference Signal |
| DCI | Downlink Control Information |
| DL | Down Link or Downlink |
| DRX | Discontinuous Reception |
| HARQ | Hybrid Automatic Repeat Request |
| IE | Information Element |
| LCID | Logical Channel Identifier |
| NCGI | NR Cell Global Identifier |
| NG | Next Generation |
| NW | Network |
| OFDM | Orthogonal Frequency-Division Multiplexing |
| OFDMA | Orthogonal Frequency-Division Multiple Access |
| PDCCH | Physical Downlink Control Channel |
| PDCP | Packet Data Convergence Protocol |
| PDSCH | Physical Downlink Shared Channel |
| PHY | Physical Layer |
| PUCCH | Physical Uplink Control Channel |
| RA | Random Access |
| REDCAP | Reduced Capability |
| RIV | Resource Indicator Value |
| RLC | Radio Link Control |
| RNTI | Radio Network Temporary Identifier |
| RRC | Radio Resource Control |
| SCS | Subcarrier Spacing |
| SFI | Slot Format Indication |
| SLVI | Start and Length Indicator Values |
| SPS | Semi-Persistent Scheduling |
| TB | Transport Block |
| UE | User Equipment |
| UL | Up Link or Uplink |

1. Mobile Communication Technology and Environment

Figure 1:
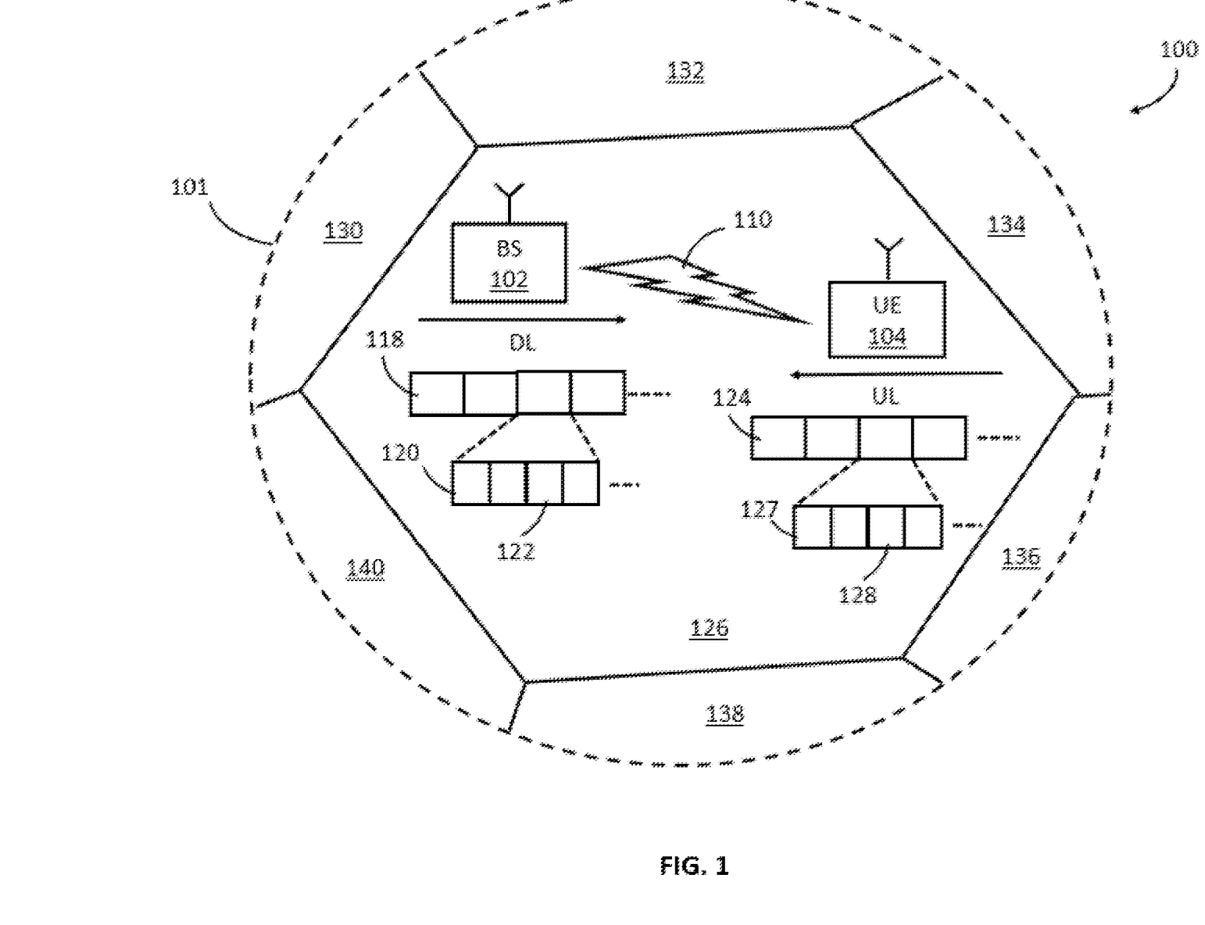
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
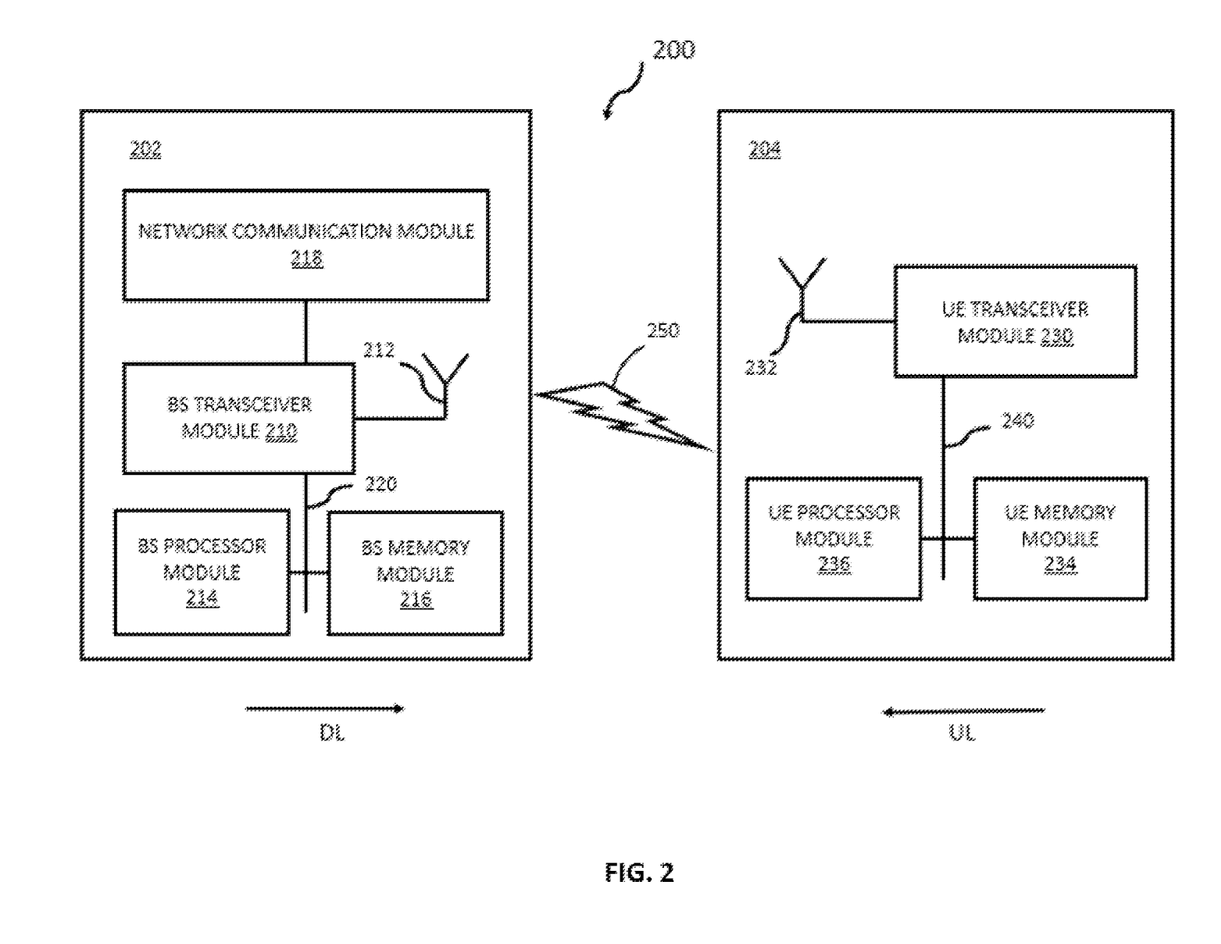
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Monitoring Control Channels Using Dynamic Downlink Control Information (DCI)

In the 5G new radio access technology (NR) communication systems, the user equipment (UE) (e.g., the UE 104 or 204 as detailed above) decoding the PDCCH may be limited by the maximum number of monitored PDCCH candidates and maximum number of non-overlapped control channel elements (CCEs). For REDCAP (reduced capability) UE, lower power saving and UE complexity may be used. Therefore, more power saving and less complexity by limiting the CCE number and PDCCH candidates can be an effective method. Simulation results show that the power saving techniques can reduce the UE power consumption compared with the legacy PDCCH candidates limits. Presented herein is a procedure to save power and reduce complexity by reducing the CCE number and PDCCH candidates. In particular, the dynamic downlink control information (DCI) indication or triggering for reducing the blind decoding the CCE number may be implemented.

The user equipment (UE) should receive the uplink scheduling grant information, prior to sending physical uplink shared channel (PUSCH) and downlink scheduling allocation information for receiving physical downlink shared channel (PDSCH). The information may be included in the downlink control information (DCI) and may be sent by the base station to the UE on the PDCCH channel in different DCI formats. Thus, the UE should first monitor the PDCCH. When UE decodes the PDCCH, the number of monitored PDCCH candidates per slot in a BWP and the number of non-overlapped CCEs per slot in a BWP may be limited as following manner.

Table 10.1-2 provides the maximum number of monitored PDCCH candidates, $M_{PDCCH}^{max,slot,\mu}$, per slot for a UE in a DL bandwidth part (BWP) with a subcarrier spacing (SCS) configuration µ for operation with a single serving cell.

TABLE 10.1-2

Maximum number $M_{PDCCH}^{max,\,slot,\,\mu}$ of monitored PDCCH candidates per slot for a DL BWP with SCS configuration $\mu \in \{0, 1, 2, 3\}$ for a single serving cell

| µ | Maximum number of monitored PDCCH candidates per slot and per serving cell $M_{PDCCH}^{max,\,slot,\,\mu}$ |
|---|---|
| 0 | 44 |
| 1 | 36 |
| 2 | 22 |
| 3 | 20 |

Table 10.1-3 the maximum number of non-overlapped CCEs, $C_{PDCCH}^{max,slot,\mu}$, for a DL BWP with SCS configuration µ that a UE is expected to monitor corresponding PDCCH candidates per slot for operation with a single serving cell. CCEs for PDCCH candidates may be identified as non-overlapped if the candidates correspond to different CORESET indexes, or different first symbols for the reception of the respective PDCCH candidates.

TABLE 10.1-3

Maximum number of $M_{PDCCH}^{max,\ slot,\ \mu}$ non-overlapped CCEs per slot for a DL BWP with SCS configuration $\mu \in \{0, 1, 2, 3\}$ for a single serving cell:

| $\mu$ | Maximum number of non-overlapped CCEs per slot and per serving cell $C_{PDCCH}^{max,\ slot,\ \mu}$ |
|---|---|
| 0 | 56 |
| 1 | 56 |
| 2 | 48 |
| 3 | 32 |

The maximum PDCCH candidates, $M_{PDCCH}^{max,slot,\mu}$ and non-overlapped CCEs, $C_{PDCCH}^{max,slot,\mu}$ can be viewed as the legacy limits. The redefined table or value can be viewed as the new limits. If the new limits is set to 0, the value may indicate that the UE is not to monitor or decode the target slots (also referred herein as PDCCH skipping). Thus, the limits may include PDCCH skipping. The CCE number or PDCCH candidates and PDCCH skipping can be viewed as a special case when maximum CCE number or PDCCH candidates is set to 0. In addition, the new limits may include the legacy limits.

In addition, the operation of the UE to monitor the PDCCH may be performed on the control resource set and the PDCCH monitoring occasions for a search space set. The relevant monitoring parameters of the PDCCH may be included in the SearchSpace field of the radio resource control (RRC) signaling. The searchSpaceId and the controlResourceSetId information elements (IE) may indicate the search space set index and control resource set (CORESET) applicable for this SearchSpace for PDCCH monitoring. The searchSpaceType IE in SearchSpace field may indicate the search space type of the PDCCH that the UE is expected to monitor. The common search space and UE-Specific search space may correspond to different DCI formats to be detected. The common search space may be a Type3-PDCCH CSS. The aggregation level and corresponding candidates may be configured by nrofCandidates in SearchSpace.

To save power and reduce UE complexity, reducing CCE number or PDCCH candidates may be performed. The UE behavior can be described as following. The UE may receive the DCI. The DCI may trigger the new limits at least in a slot. After an application delay (denoted as X), the UE may monitor the slots in a limit duration (denoted as Y) with the new limits. After Y, the UE may receive a DCI indicating that UE is to use the legacy or new limits or that the UE is to receive a predefined DCI format. In this manner, the UE may monitor the slots with legacy or new limits.

Using DCI indication or special DCI triggering, the UE may start to monitor Y (e.g., in slots or milliseconds) with the new limits. The new limits, limit duration Y, application delay X, or target slots in Y can be configured by RRC, DCI, or via a default setting. In addition, a specific AL and corresponding candidates can be configured for the UE. The triggering method, target SS, or a method of fallback to legacy limits can be specified.

A. Downlink Control Information (DCI) to Indicate or Trigger New Limits

1. Triggering Method

Any of the triggering methods discussed below may be executed after the parameter in higher layer is configured, or after the feature corresponding to the reduced PDCCH candidates or CCE number is enabled.

In some embodiments, a new or specific DCI format can be used to indicate or trigger the new limits. When the UE detects the DCI format, the UE may monitor the target slots with new limits according to the indication by DCI, higher layer configuration, or default rules.

In some embodiments, a new or specific radio network temporary identifier (RNTI) may be used to trigger the UE to use the new limits. If the UE detects a DCI scrambled with the RNTI, the UE may monitor the target slots using the new limits according to the indication by DCI, a higher layer configuration, or default rules.

In some embodiments, a UE group DCI (scrambled with or without new RNTI) can be used to indicate the new limits for a targeted group of UEs. When the UE (belonging to the group) detects the DCI, the UE may monitor the target slots with new limits according to the indication by DCI, a higher layer configuration, or default rules.

In some embodiments, N bits (forming a field) in DCI may be used to indicate whether to use the new limits or legacy limits. When the UE detects this field in DCI, the UE may monitor the target slots with new limits or legacy limits according to the indication by DCI. The number of bits may be greater than or equal to ($N \geq 1$).

In some embodiments, a new or specific DCI may triggers the new limits, such as a semi-persistent scheduling, downlink (SPS-DL) DCI or a downlink (DL) semi-persistent scheduling (SPS) assignment PDCCH, a configuration grant uplink (CG-UL) DCI or a configured uplink (UL) grant Type 2 PDCCH, or a slot format indication (SFI) DCI. If the UE detects the special DCI, the UE may monitor the target slots with new limits according to the indication by DCI, higher layer configuration, or default rules.

In some embodiments, any DCI may trigger use of new limits. When the UE receives a DCI, the new limits may be triggered.

2. Indication of Limits by RRC, DCI or Default Setting

The legacy limits table can be viewed as one limit set for different subcarrier spacing (SCS). Conversely, there may be N limit sets. N number of limit sets (or N tables each with 1 value; or one table with N values) for PDCCH candidates or CCE number can be indicated by DCI, predefined, or configured by higher layers (e.g., RRC).

Higher layer indication may include a field that indicates or specifies the specific limit sets (to be used by the UE or suggested for use by the UE). Each limit set may have a limit identifier or number (e.g., can be in the field or not). Another field may indicate a list of limit identifier numbers (e.g. suggested to the UE to use). The higher layer indication may include using $[\log_2 (N)]$ bits to indicate the N limit sets.

DCI indication may include a field to indicate the N limit sets. The N limit sets can be predefined or can be from a list. An example of N limit sets is shown in TABLE 1 below:

TABLE 1

| SCS (subcarrier spacing) | $X_1$, | $X_2$, ... | ... | $X_N$ |
|---|---|---|---|---|
| u = 0 | $M_1$ | $M_2$ | ... | $M_N$ |
| u = 1 | $H_1$ | $H_2$ | ... | $H_N$ |
| u = 2 | $P_1$ | $P_2$ | ... | $P_N$ |
| u = 3 | $Q_1$ | $Q_2$ | ... | $Q_N$ |

As indicated above, for a SCS (u value), $X_i$ may include a value that identifies a specific limit set from legacy limits. For a SCS, $X_i$ may include a value equal to 0 (e.g., no monitoring of PDCCH by the UE).

In addition, X can be part of an integer range [$X_1$~$X_N$], shown as TABLE 2

TABLE 2

| SCS | $X_1$~$X_N$ |
|---|---|
| u = 0 | $M_1$~$M_N$ |
| u = 1 | $H_1$~$H_N$ |
| u = 2 | $P_1$~$P_N$ |
| u = 3 | $Q_1$~$Q_N$ |

Similarly, for a SCS, Xi may comprise a value from legacy limits. Furthermore, for a SCS, Xi may comprise a value equal to 0 (e.g., no monitoring by UE). If N=2 (2 limits sets=1 legacy set, 1 new set), a specific example can be shown as following:

Example 1-1: n is Coefficient, 2 Limit Sets for PDCCH Candidates

| μ | Maximum number of monitored PDCCH candidates per slot and per serving cell $M_{PDCCH}^{max,\ slot,\ \mu}$ (legacy) | Maximum number of monitored PDCCH candidates per slot and per serving cell $M_{PDCCH}^{max,\ slot,\ \mu}$ |
|---|---|---|
| 0 | 44 | 44/n(rounding up or rounding down) |
| 1 | 36 | 36/n(rounding up or rounding down) |
| 2 | 22 | 22/n(rounding up or rounding down) |
| 3 | 20 | 20/n(rounding up or rounding down) |

Example 1-2: n is Coefficient, 2 Limit Sets for CCE Number

| μ | Maximum number of non-overlapped CCEs per slot and per serving cell $C_{PDCCH}^{max,\ slot,\ \mu}$ (legacy) | Maximum number of non-overlapped CCEs per slot and per serving cell $C_{PDCCH}^{max,\ slot,\ \mu}$ |
|---|---|---|
| 0 | 56 | 56/n(rounding up or rounding down) |
| 1 | 5 | 56/n(rounding up or rounding down) |
| 2 | 48 | 48/n(rounding up or rounding down) |
| 3 | 32 | 32/n(rounding up or rounding down) |

In the example above, n may be predefined integer or configured or obtained by higher layer configuration (e.g., RRC).

Example 1-3: Each of New Limit Sets is Set to 0 for PDCCH Candidates (in Some Scenarios, Only Some or all of the New Limit Set May be Set to 0

| μ | Maximum number of monitored PDCCH candidates per slot and per serving cell $M_{PDCCH}^{max,\ slot,\ \mu}$ (legacy) | Maximum number of monitored PDCCH candidates per slot and per serving cell $M_{PDCCH}^{max,\ slot,\ \mu}$ |
|---|---|---|
| 0 | 44 | 0 |
| 1 | 36 | 0 |
| 2 | 22 | 0 |
| 3 | 20 | 0 |

Example 1-4: Each of New Limit Sets is Set to 0 for CCE Number. In Some Scenarios, Only Some of the New Limit Set May be Set to 0

| μ | Maximum number of non-overlapped CCEs per slot and per serving cell $C_{PDCCH}^{max,\ slot,\ \mu}$ (legacy) | Maximum number of non-overlapped CCEs per slot and per serving cell $C_{PDCCH}^{max,\ slot,\ \mu}$ |
|---|---|---|
| 0 | 56 | 0 |
| 1 | 5 | 0 |
| 2 | 48 | 0 |
| 3 | 32 | 0 |

If the limit set is set to 0, the UE may forego monitor the slots in Y. Furthermore, if one value in the limit set for a SCS is set as 0, the UE may forego monitoring the slots in Y when configured with the SCS.

3. Application Delay (X)

In some embodiments, if the DCI triggering condition is satisfied, the UE may start to use the new limits (e.g., immediately), meaning that X=0 or parameter X does not need to be configured. The parameter X may not exist or may not be defined. In some embodiments, if the DCI triggering condition is satisfied, the UE may start to use the new limits after application delay X>0 (slots or ms). The value X can be predefined or configured by higher layer signaling (e.g., RRC), and may be defined, for example, in the following manner:

$$X = \left\lfloor n \frac{2^{uPDSCH}}{2^{uPDCCH}} \right\rfloor + X_0, \text{ or}$$

$$X = \left\lfloor n \frac{2^{uPDSCH}}{2^{uPDCCH}} \right\rfloor + X_0 + Z_u$$

where n is the slot (or duration of the slot) with the scheduling DCI; $X_0$ is based on the numerology of PDSCH; $\mu_{PDSCH}$ and $\mu_{PDCCH}$ are the subcarrier spacing configurations for PDSCH and PDCCH respectively; and $Z_u$ is a fixed or configured value according to the different SCS.

$X_0/Z_u$ may be predefined or configured by higher layer configurations as follows:

| SCS | X0/$Z_u$ |
|---|---|
| u = 0 | M |
| u = 1 | N |
| u = 2 | P |
| u = 3 | Q |

The application delay X can be configured in SPS-DL (e.g., using SPS-Config which is a RRC parameter), CG-UL (ConfiguredGrantConfig, which is a higher-layer parameter such as RRC), or can be configured per bandwidth part (BWP). In the per BWP configuration, each configuration may be valid in corresponding BWP. BWP switching may refer to the changing of the configuration (when changed to a different BWP).

4. Limit Duration (Y)

In the limit duration Y, the UE may monitor the slots using the new limits. The UE may define Y using any of the procedures discussed herein. In some embodiments, the limit duration Y can be defined as a timer. In some embodiments, the limit duration Y may be set to a default value (e.g., Y=8 slots/ms). In some embodiments, the limit duration Y may be a configured value configured by higher layers. For example, the value may be configured in SPS-Config/ConfiguredGrantConfig. The value may be also configured per BWP or per search space (SS).

In some embodiments, the limit duration Y may be indicated by DCI. The value set of Y may be predefined or is configured by a list in a higher layer parameter. In some embodiments, the limit duration Y may be defined as the time domain duration between the PDCCH ending slot and corresponding PDSCH/PUSCH starting slot. The value may be, for example, equal to K0/K2, including or excluding the application delay X.

In some embodiments, the limit duration Y may be defined as the time domain duration between the PDSCH starting (or ending) slot and acknowledge (e.g., ACK or NACK) feedback starting (or ending) slot. The value may exclude the application delay X. In some embodiments, the limit duration Y may be defined between the PDCCH ending slot and the acknowledge (e.g., ACK/NACK) feedback starting (or ending) slot. The value may exclude the application delay X.

In some embodiments, the limit duration Y may configured on a per BWP basis. Each configuration may valid in corresponding BWP. BWP switching may refer to the change in the configuration. In some embodiments, the limit duration Y may be configured on a per SS basis. Each configuration may be valid in corresponding searchspace. Different SS may indicate a change in the configuration. For example, the limit duration timer may be defined to have the possible Y values of {2, 4, 8, 16} and the DCI may indicate value 4 using 2 bits. The UE in turn may use the new limits in Y=4 slots/ms. If the timer expires (e.g., goes beyond Y=4 slots/ms), the UE may fall back to the legacy limits.

5. Fallback Method to Legacy Limits

In some embodiments, one or more states in a field of the DCI or a medium access control control element (MAC CE), or one or more bits of the DCI or the MAC CE, may be used. For example, an N-bit indication may be used. One of 2^N states in N bits or N bits field in DCI may be used to indicate using the legacy limits or new limits. When the UE receive the state indicating the new limits, UE may monitor the slots in Y with the new limits. When the UE receive the state indicating the legacy limits, UE may monitor the slots with the legacy limits.

In some embodiments, the triggering or the indication of the legacy limits (e.g., for fallback method) may be via an expiration of a timer. In some embodiments, the triggering or the indication of the legacy limits may be via a defined DCI format. In some embodiments, the triggering or the indication of the legacy limits may be via at least a portion of the DCI scrambled by a CS-RNTI or a defined RNTI. In some embodiments, the triggering or the indication of the legacy limits may be via a defined AL. In some embodiments, the triggering or the indication may be via a defined condition.

In some embodiments, when the timer with limit duration Y expires, the UE may fall back to monitor the slots with legacy limits. In some embodiments, when the UE receive a predefined DCI format (e.g., deactivated SPS-DL or CG-UL DCI), the UE may fall back to monitor the slots with legacy limits. For example, when the UE receives the deactivated SPS-DL DCI, the UE may fall back to monitor the slots with legacy limits. In some embodiments, when the PDSCH ends or ACK/NACK ends, the UE may fall back to monitor the slots with legacy limits.

In some embodiments, the DCI activating new limits may be UE group DCI, and the deactivating DCI may be UE specific DCI or the timer expires. In some embodiments, the DCI activating new limits may be UE group DCI, and the deactivating DCI may be UE group DCI or the timer expires. In some embodiments, the DCI activating new limits may be UE specific DCI, and the deactivating DCI may be UE specific DCI or the timer expires. The UE group DCI may refer to the UE group common CSS (type 3 CSS). The SPS-DL DCI may refer that the DCI scrambled with CS-RNTI is used for SPS scheduling. The definition may be similar with the CG-UL DCI.

B. Target Slots in Limit Duration (Y)

Within the limit duration Y, all (or some of) the occasion slots can be monitored with new limits. For instance, some of the occasion slots can be selected as the target slots with new limits, and the other slots can be monitored with the legacy limits.

1. Cycling Though Every N Occasion Slots

N may be configured by higher layer, and may determines the number of bits in DCI. For example, N may be configured by higher layer. The 2 bits field in DCI may be used to indicate whether each slot is a target slot to use the new limits or not. The DCI may be UE-specific, with one DCI only can be used for a particular UE.

Additionally, the DCI can be a UE group DCI. A DCI can be used to indicate for multiple UEs. The DCI structure can be similar as: {block number 1, block number 2, . . . , block number N}. Each block may have a field for each UE of the UE group. The starting position of a block may be determined by a parameter provided by higher layer configuration for the UE configured with the block.

2. Predefined Limits for Every n Occasion Slots

The UE may apply the upper limits for a first slot, and another set of upper limits for a second slot, according to a rule. Each occasion may have corresponding limits and every n occasion slots cycle. The specific limits for n occasion slots are predefined (e.g., via rules). For example, the rules may be as follows: (1) the first slot is to correspond to limit X1 and the second slot is to correspond to limit X2. The n-th slot occasion is to correspond to $X_n$ satisfied with $X1 \leq X2 \leq \ldots \leq X_n$; (2) the first slot is to correspond to limit X1, the second slot is to correspond to limit X2, and the n-th slot occasion is to correspond to $X_n$ satisfied with $X1 \geq X2 \geq \ldots \geq X_n$; (3) $X_{2i} \leq X_{2i+1}$ or $X_{2i} \geq X_{2i+1}$ where i is the natural number; and (4) other rules redefined or configured by higher layer.

3. Definition of the Target Slot Set Selected by DCI Indication

The UE may select the rule from a plurality of rules, according to an indication of the DCI. In some embodiments, when there are predefined M rules, the DCI may be used to indicate one of M rules with $\lceil \log_2(M) \rceil$ bits. In some embodiments, when there are M rules configured by higher layer, the DCI may be used to indicate one of M restrictions with $\lceil \log_2(M) \rceil$ bits Which rules are to be selected may be in accordance with the DCI, subject to one or more restrictions. The restrictions may include cycling every N occasion slots configured by higher layer. The restrictions may include predefined or configured limits for every n occasion slots (e.g., rule 1, rule 2, rule 3, etc.).

C. Indication of DCI Regarding the Aggregation Level (AL) and Corresponding Candidates The searchspace IE may configure the AL and PDDCH candidates for a SS. Since the AL should be adaptive for a RRC period, more types of aggregation levels may be configured, leading to use of more PDCCH candidates. If for a period of time, however, the channel condition is identified to be static, less PDCCH candidates can be used to save the power and UE processing time.

DCI may indicate the AL and candidates for the target SS. When the UE monitors the slots in target SS, the UE may decode the PDCCH with the AL and candidates in limit duration Y. After limit duration time Y or when the UE receives the indication to fall back to legacy limits, UE may fall back to monitor the slot with RRC configured AL and candidates.

1. Target Search Space

In some embodiments, the target SS may correspond to the SS which the DCI indicating AL and candidates corresponds to. This may mean that the UE is to monitor a single specific SS with the indicated AL and candidate. In some embodiments, the target SS may correspond to the USS. This may mean that the UE is to monitor the USS with the indicated AL and candidate. In some embodiments, the target SS may include the USS or UE group CSS. In some embodiments, the target SS may be configured by higher layer. For example, 1 bit in searchspace IE may indicate whether is target SS. In addition, the X bits in a parameter in RRC to indicate which SS are selected as target SS.

In some embodiments, the target SS may be indicated by DCI. The DCI may indicate one or more SS from the USS, a group common CSS, or a cell specific CSS, among others. For example, the target SS set may include all the USSs. X USSs may be configured for the UE. There may be X bits with bitmap in DCI indicating which SS are the target SS. In another example, the target SS set may be all the USSs, and one of the X total number of USSs may be the target SS. There may be $\lceil \log_2 X \rceil$ bits in DCI indicating which SSs are selected.

2. Triggering

If the number of total SS is larger or equal than N or if the number of USS is larger or equal than N, or the number of SS configured by searchspace IE is larger or equal than N, or the number of target SS is larger or equal than N, the field may indicate that the AL or corresponding candidates in DCI is present.

If there are X types of aggregation levels for a SS configuration or for multiple SS configuration with X≥X0 (where X0 is a threshold value), the field may indicate that the AL or corresponding candidates in DCI is present. If the higher layer configure a specific parameter, or if a parameter provided by higher layer indicates enable this feature, the field may indicate that the AL or corresponding candidates in DCI is present.

The triggering method and the application delay method described above may also be applicable. The limit duration Y and target slots method described above may also be applicable.

3. Indication in DCI on the AL and Candidate from the Existing Configuration from RRC Parameter Searchspace IE If there are X types of aggregation levels for a SS configuration or multiple SS configuration, $\lceil \log_2(X) \rceil$ or $\lceil \log_2(X+1) \rceil$ bits may be used to indicate which AL (1 type of AL) and corresponding candidates may be selected, using DCI or RRC signaling. For example:

| | |
|---|---|
| 000 | AL = 1 |
| 001 | AL = 2 |
| 010 | AL = 4 |
| 011 | AL = 8 |
| 100 | AL = 16 |
| 101 | RRC configured AL and candidate |
| 110 | spare |
| 111 | spare |

If there are X types of aggregation levels for a SS configuration or multiple SS configuration, N bits may be used to indicate which AL (1 or more type of AL) and candidate may be selected.

If N is configured, there may be at most 2^N states. For example, N=3 and there are 4 types of AL including {x0, x1, x2, x3} (AL set):

| states | Indicated AL |
|---|---|
| 000 | AL = x0 |
| 001 | AL = x1 |
| 010 | AL = x2 |

-continued

| states | Indicated AL |
|---|---|
| 011 | AL = x3 |
| 100 | AL = x0, x1 |
| 101 | AL = x1, x2 |
| 110 | AL = x2, x3 |
| 111 | the whole AL set |

For example, N=3 and there are 5 types of AL including {x0,x1,x2,x3,x4} (AL set):

| states | Indicated AL |
|---|---|
| 000 | AL = x0 |
| 001 | AL = x1 |
| 010 | AL = x2 |
| 011 | AL = x3 |
| 100 | AL = x4 |
| 101 | AL = x0, x1 |
| 110 | AL = x2, x3 |
| 111 | the whole AL set |

For example, N=3 and there are 3 types of AL including {x0,x1,x2} (AL set):

| states | Indicated AL |
|---|---|
| 000 | AL = x0 |
| 001 | AL = x1 |
| 010 | AL = x2 |
| 011 | AL = x0, x1 |
| 100 | AL = x1, x2 |
| 101 | AL = x0, x2 |
| 110 | spare |
| 111 | the whole AL set |

For example, N=2 and there are 3 types of AL including {x0,x1,x2} (AL set):

| states | Indicated AL |
|---|---|
| 00 | AL = x0 |
| 01 | AL = x1 |
| 10 | AL = x2 |
| 11 | the whole AL set |

For example, N=2 and there are 2 types of AL including {x0,x1,} (AL set):

| states | Indicated AL |
|---|---|
| 00 | AL = x0 |
| 01 | AL = x1 |
| 10 | spare |
| 11 | the whole AL set |

When the $x_{i-1} < x_i$, there may be rules should be considered: (1) a small AL is to have a higher priority; (2) a small number of AL types is to have a higher priority; and (3) "continuous" multiple ALa($x_{i-1}$, $x_i$) is to have higher priority than "discontinuous" ($x_{i-1}$, $x_{i+1}$).

The AL set may be divided as x groups, and may use $\lceil \log_2 x \rceil$ bits to indicate one of the groups. In some embodiments, a bitmap or a resource indicator value (MV) method may be used to divide the AL set into groups. With bitmaps, the AL set comprise n types of AL. A bitmap with n bits to indicate which type of AL are selected into one group. With the RIV method, the procedure may be defined in the following manner:

```
if (L − 1) ≤ n₀ then
    SLIV = n · (L − 1) + S
else
    SLIV = n · (n − L + 1) + (n − 1 − S)
``` where 0<L≤14−S, S refers the starting AL, L refers the number of types of AL comprised by one group, a Start and Length Indicator Value (SLIV) refers the indicator for one group, and no is equal to n/2, or $\lfloor n/2 \rfloor$ or $\lceil n/2 \rceil$ The baseline AL may be defined in the following manner. In some embodiments, the baseline AL may be based on an average. The average AL configured by SS (e.g., USS, USS and UE group CSS, one SS, all the SS or predefined, configured SS, or target SS) may be assumed as the Baseline AL(BAL). The AL set may be $\{M_1, M_2 \ldots, M_J\}$, the BAL $M_j$ may be determined to satisfy $$\left| M_i - \frac{\sum_{j=1}^{J} M_j}{J} \right|$$

minimum. If there are two different solutions for $M_i$, the larger one or the smaller one can be used for BAL.

In some embodiments, the baseline AL may be used according to the mode, median, mode, or variance. The Mode, median, mode, variance of the AL configured by SS (e.g., USS, USS and UE group CSS, one SS, all the SS or predefined or configured SS, or target SS) can be used to calculate the BAL. The operation can be similar with the average.

The AL may be defined based on the BAL, DCI with N bits by an offset. For example, N=2, set the BAL as $M_i$

| 00 | BAL = $M_i$ |
|---|---|
| 01 | $M_i$, $M_{i-1}$ |
| 10 | $M_i$, $M_{i+1}$ |
| 11 | RRC configuration |

An AL set may be defined for occasion slots cycling. The AL set may be defined for J occasion slots, for example,$\{M_1, M_2 \ldots, M_J\}$. The UE may monitor the (1+J*n)-th slot with AL=$M_1$, and may monitor the (i+J*n)-th slot with AL=$M_i$, where n is natural number. An offset A can be considered. The UE may monitor the (1+J*n+A)-th slot with AL=$M_1$, and monitor the (i+J*n+A)-th slot with AL=$M_i$, Multiple AL sets can be predefined or RRC configured or configured by higher layers; one of the sets can be indicated or selected by DCI, RRC parameter, higher layer configuration, or default rules.

4. Procedure to Fallback to Legacy Monitoring

In some embodiments, 1 bit in DCI may be used to indicate whether to fall back to legacy monitoring or limits. In some embodiments, 1 state in N bits may be used to indicate the UE to fall back to legacy monitoring or limits. After the limit duration Y or after the timer expires, UE may fall back to the legacy monitoring or limits.

Regarding UE behavior, the UE may be not expected to receive a DCI on a slot which cannot be distinguished between 2 or more Search spaces. In some embodiments, the UE may not expected to receive multiple DCIs on a occasion slot indicating different AL and candidate. When the UE receives the DCI indicating AL or candidates (limits), in the application delay X, UE may not be expected to receive a DCI changing the AL and candidates.

D. Detection of Downlink Control Information (DCI) with AL Set to X and DCI Format Z in Corresponding SS Regarding the AL, after the UE detects the DCI with AL set $X=\{M_1, M_2 \ldots, M_J\}$ in the time limit duration Y or target slots or target SS, the UE may (or may be expected to) monitor the slots with AL=X. After UE detects the DCI with AL set X in slot i $X_i=\{M_1, M_2 \ldots, M_J\}$, the UE may monitor the next PDCCH occasion slot with AL $X_i=\{M_1, M_2 \ldots, M_J\}$. In other words, UE may (or may be expect to) monitor the PDCCH occasion slot i (e.g., in target slots, target SS, limit duration Y, or others) with AL $X_{i-1}=\{M_1, M_2 \ldots, M_J\}$. The set $X_{i-1}=\{M_1, M_2 \ldots, M_J\}$ may be the AL set when UE is to monitor the PDCCH occasion slot i-1 and detect the DCI with. The candidates can be the same for a AL.

Regarding the number of DCI size types or DCI formats, after the UE decodes the PDCCH occasion slot with triggering DCI and UE obtains the number of DCI size types (or DCI formats) x in the slot, the UE may be expected to monitor the slot with the limits related to the x in time limit duration Y. For example, when x belongs to 1~threshold x0, a new limit or limit $X_0$ may be used. Otherwise the corresponding legacy limits may be used. When X belongs to an interval $x_{i-1}+1 \sim_{xi}$, a new limit or limit $X_i$ may be used.

The limit duration Y may be defined based on slots, milliseconds, timer, number of PDCCH monitoring occasions, or a number of PDCCH monitoring occasions for a SS, among others. Additionally, besides the PDCCH candidates and CCE number, the limits also may include the PDCCH skipping (or PDCCH muting), limited searchspace, or limited CORESET, among others.

E. Semi-Persistent Scheduling (SPS) Validation

When multi-transport blocks (TBs) scheduling feature is configured or enabled, special fields for SPS Activation or Release M-PDCCH Validation may be as following. A redundancy version in scheduling TBs for Unicast field may be set to 0 (e.g., '00'). A hybrid automatic repeat request (HARQ) process number in scheduling TBs for Unicast field for DCI format 6-0A may be set to '000'. A HARQ process number in Scheduling TBs for Unicast field for DCI format 6-1A in a frequency division duplex (FDD) may be set to '000'. A HARQ process number in scheduling TBs for Unicast field for DCI format 6-1A in a time division duplex (TDD) may be set to '0000' or '000'. For example:

TABLE 9.2-1D

Special fields for SPS Activation MPDCCH Validation if multi-TB-DL-config or multi-TB-UL-config is configured:

| | DCI format 6-0A | DCI format 6-1A |
|---|---|---|
| HARQ process number in Scheduling TBs for Unicast field | set to '000' | set to '000' |
| Redundancy version in Scheduling TBs for Unicast field | set to '00' | set to '00' |
| TPC command for scheduled PUSCH | set to '00' | N/A |
| TPC command for scheduled PUCCH | N/A | set to '00' |

TABLE 9.2-1E

Special fields for SPS Release MPDCCH Validation if multi-TB-DL-config or multi-TB-UL-config is configured:

| | DCI format 6-0A | DCI format 6-1A |
|---|---|---|
| HARQ process number in Scheduling TBs for Unicast field | set to '000' | set to '000' |
| Redundancy version in Scheduling TBs for Unicast field | set to '00' | set to '00' |
| Repetition number | set to '00' | set to '00' |
| Modulation and coding scheme | set to '1111' | set to '1111' |
| TPC command for scheduled PUSCH | set to '00' | N/A |
| Resource block assignment | Set to all '1's | Set to all '1's |

Multi-TB HARQ processes group field may be set to '0'. A Multi-TB HARQ processes group field may be set to '0' if present.

Figure 3:
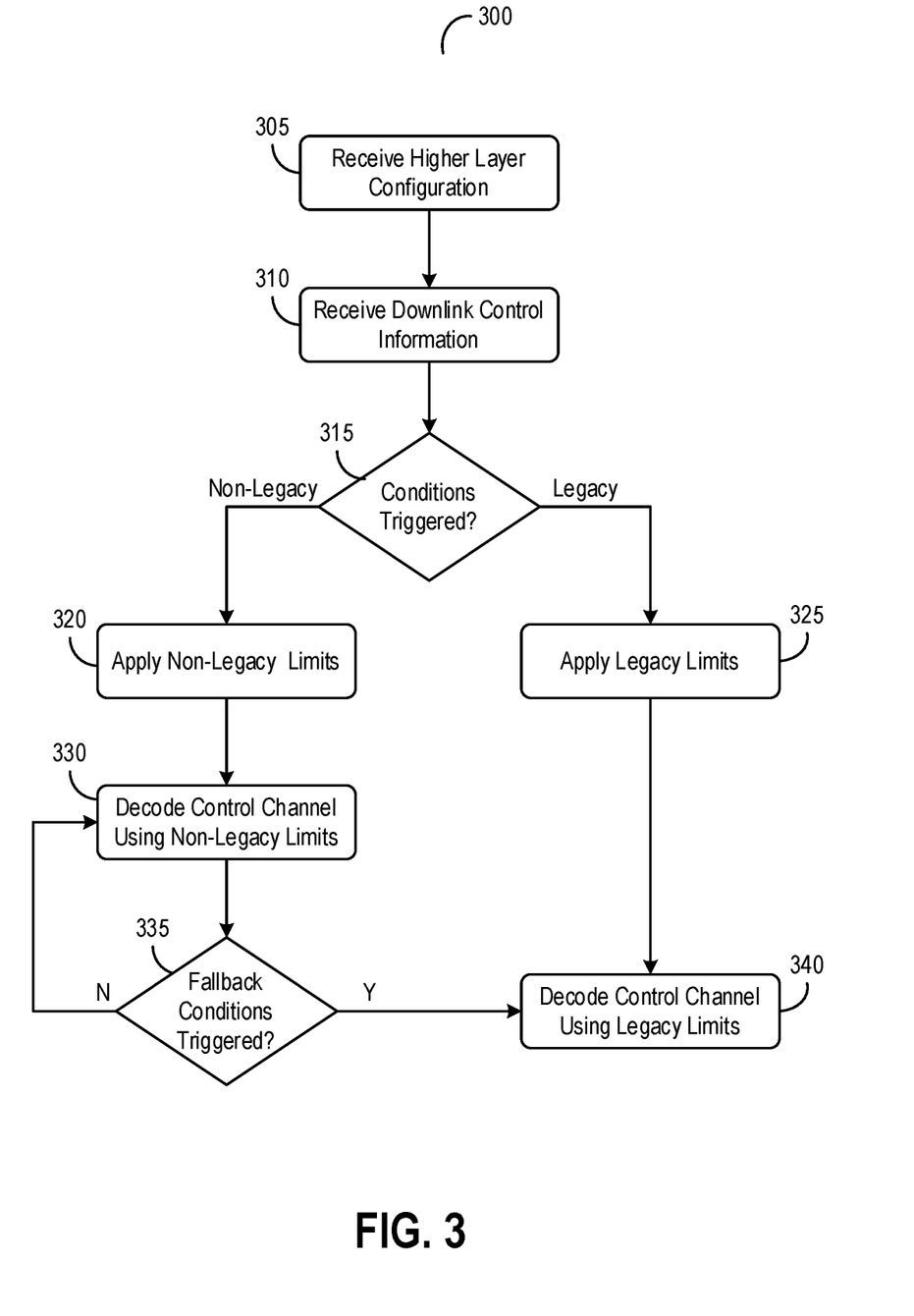
FIG. 3 illustrates a flow diagram for an example method of monitoring control channels using dynamic downlink control information in accordance with an illustrative embodiment.

F. Method for Monitoring Control Channels Using Dynamic Downlink Control Information Referring now to FIG. 3, depicted is a method 300 of monitoring control channels using dynamic downlink control information (DCI). The method 300 may be implemented using or performed by one or more components detailed herein, such as BS 102 or UE 104. In brief overview, a wireless communication device may receive a higher layer configuration (305). The wireless communication device may receive a downlink control information (310). The wireless communication device may determine whether to use legacy or non-legacy limits (315). When the determination is to use legacy limits, the wireless communication device may apply non-legacy limits (320). Conversely, when the determination is to use non-legacy limits, the wireless communication device may apply legacy limits (325). The wireless communication device may decode the control channel using the non-legacy limits (330). The wireless communication device may determine whether to fall back conditions are satisfied (335). The wireless communication device may decode the control channel using legacy limits (340).

In further detail, a wireless communication device (e.g., UE 104) may retrieve, identify, or receive a higher layer configuration from a wireless communication node (e.g., BS 102) (305). The wireless communication node may provide, send, or transmit the higher layer configuration to the wireless communication device. The higher layer configuration may include one or more parameters, such as: radio resource control (RRC) parameters, discontinuous reception (DRX) parameters, and bandwidth part (BWP) related parameters, among others. The parameters of the higher layer configuration may specify, identify, or otherwise define a control channel (e.g., physical downlink control channel (PDCCH)) candidates per slot and control channel elements (CCE) number limits per slot. Each slot may correspond to or include a resource (e.g., time and frequency) for the control channel. The control channel candidates may identify or include a set of control channels in a single cell to be monitored by the wireless communication device. The CCE number limits may define or specify a number of non-overlapping elements in the single cell in the control channels.

The wireless communication device may retrieve, identify, or otherwise receive a downlink control information (DCI) from the wireless communication node (310). The wireless communication node may provide, send, or transmit the DCI to the wireless communication device. The DCI may be configured to trigger or indicate upper limits for control channel (e.g., PDCCH) monitoring. The upper limits may relate to the number of PDDCH and number of control channel elements in one or more slots. In some embodiments, the upper limits for PDCCH monitoring may identify or include a maximum number of PDCCH candidates to be monitoring in one or more slots (M-PDDCH). In some embodiments, the upper limits for PDCCH monitoring may identify or include a maximum number of non-overlapping control channel elements (CCEs) in one or more slots. In some embodiments, the upper limits may identify or include legacy limits or non-legacy limits. In some embodiments, the upper limits may have the M-PDCCH set to null (e.g., 0). In some embodiments, the upper limits may have M-CCE set to null (e.g., 0). In some embodiments, the upper limits may include values for the M-PDCCH or the M-CCE for each sub-carrier spacing (SCS). In some embodiments, the upper limits may include a range of values for the M-PDCCH or the M-CCE for each SCS. In some embodiments, the upper limits may include one or more constraints for PDCCH monitoring, such as a limit for PDCCH skipping or muting, a limit for search space, and a limit for a control resource set (CORESET), among others.

The wireless communication device may be triggered by the DCI to use the non-legacy (or legacy) values for the upper limits. The DCI may be configured to trigger or indicate the upper limits using any number of conditions or factors. In some embodiments, the DCI may identify or have a new or defined DCI format. The DCI may be in accordance with various formats (e.g., 1-x, 0-x, or 2-x), and one or more of the formats may be used to trigger or indicate the upper limits for PDCCH monitoring. In some embodiments, at least a portion of the DCI may be scrambled by a configured a scheduling radio network temporary identifier (CS-RNTI) or a defined RNTI. The portion of the DCI may correspond to cyclic redundancy check portion, and may be scrambled to trigger or indicate the upper limits. The RNTI may be defined or newly defined, and may correspond to the wireless communication device. In some embodiments, the configuration of the DCI to trigger or indicate the upper limits may be via a PDCCH, such as a downlink (DL) semi-persistent scheduling (SPS) assignment PDCCH or an uplink (UL) grant type 2 PDCCH, among others. In some embodiments, the DCI may correspond to, include, or be a DCI for a group of wireless communication devices that includes the wireless communication device. The DCI group may be identified with or without using an RNTI for a targeted group of wireless communication devices.

In some embodiments, the configuration of the DCI to trigger or indicate the upper limits may be via N bits in the DCI (e.g., with N≥1). The N bits may indicate use of one or more legacy limits or one or more non-legacy limits. The N-bits may form a field in the DCI to indicate use of the legacy or non-legacy limits. In some embodiments, the configuration of the DCI to trigger or indicate the upper limits via a field in the DCI. The field may indicate the use of legacy or non-legacy limits. In some embodiments, the configuration of the DCI to trigger or indicate the upper limits may be via the DCI being or correspond to a defined DCI. The defined DCI may be a newly defined DCI or in accordance with one or more of a predefined or existing set of DCIs. In some embodiments, the configuration of the DCI to trigger or indicate the upper limits may be in response to receipt of any DCI.

In some embodiments, the wireless communication device may be configured to be triggered by the DCI via the higher layer configuration of a parameter. The higher layer configuration may be by RRC, DCI, or by default, and may include a field including the parameter to trigger or indicate the upper limit. In some embodiments, the wireless communication device may be configured to be triggered by the DCI via the parameter enabling at least one feature associated with the upper limits. The at least one feature may be indicated or included in the higher layer configuration (e.g., in the field containing the parameter).

The wireless communication device may identify or determine conditions trigger the upper limits for PDCCH monitoring (315). The determination may be in accordance with the DCI received from the wireless communication node. Upon receipt, the wireless communication device may parse the DCI. The parsing of the DCI may indicate whether the upper limits are to be triggered for PDCCH monitoring. For example, the wireless communication device may parse the N bits in the DCI field. From the N-bits, the wireless communication device may determine whether to use the legacy values or non-legacy values for the upper limits. If the N-bits indicate use of non-legacy (or redefined) values, the wireless communication device may determine that the non-legacy values are to be used for PDCCH monitoring. On the other hand, if the N-bits indicate the use of legacy values, the wireless communication device may determine that the legacy values are to be used, the wireless communication device may determine that such values are to be used for PDCCH monitoring. When the determination is to use legacy limits, the wireless communication device may identify, select, or otherwise apply non-legacy limits (320). Conversely, when the determination is to use non-legacy limits, the wireless communication device may identify, select, or otherwise apply legacy limits (325).

The wireless communication device may process or decode the control channel using the non-legacy limits (330). The wireless communication device may decode at least one PDDCH in at least one slot in accordance with the upper limits set at non-legacy values. The wireless communication may monitor for PDCCH in at least one slot using the upper limits. By decoding, the wireless communication device may find or identify PDCCH data (e.g., DCI). In some embodiments, the wireless communication device may apply blind decoding to search for the PDCCH within the slot. In some embodiments, the wireless communication device may decode the PDCCH in the slot within a time duration. The time duration may correspond to at least one target slot, at least one target search space (SS), at least one target slot in the target SS, or a PDCCH occasion of the target SS, among others.

In some embodiments, the wireless communication device may identify or determine a starting location to apply the upper limits. The starting location may identify a location (e.g., time) at which to apply the upper limits for PDCCH monitoring. The determination of the starting location may be in accordance with an application delay or after the slot of the DCI when the application delay is zero time unit or absent. In some embodiments, the wireless communication device may identify, calculate, or determine the application delay using any number of factors. In some embodiments, the determination of the application delay may be in accordance with one or more parameters of the higher layer configuration. In some embodiments, the determination of the application delay may be in accordance with a numerology of at least one physical downlink shared channel (PDSCH), physical uplink shared channel (PUSCH), or the PDCCH. In some embodiments, the determination of the application delay may be on a per bandwidth part (BWP) basis. With the determination, the wireless communication device may decode the PDCCH after a time duration corresponding to the application delay or after the slot of the DCI when the application delay is a zero time unit or absent.

In some embodiments, the wireless communication device may apply or use the upper limits in the decoding of the at least one PDCCH during a time duration corresponding to a limit duration. The limit duration may be defined in accordance with a number of slots, millisecond, PDCCH monitoring occasions, PDCCH monitoring occasions for an SS, or according to a timer. The wireless communication device may identify, calculate, or determine the limit duration using any number of factors. In some embodiments, the limit duration may be in accordance with a defined timer. In some embodiments, the limit duration may be in accordance with a defined value, such as a default value, an only value, predefined value, a specific value, or one of a set of values. In some embodiments, the limit duration may be in accordance with the higher layer configuration. In some embodiments, the limit duration may be in accordance with an indication from the DCI (e.g., as specified in a field). In some embodiments, the limit duration may be in accordance with a defined duration relative to one or more channels (e.g., between the PDCCH ending slot and corresponding PDSCH or PUSCH starting slot or equal to K0/K2 as defined above). In some embodiments, the limit duration may be in accordance with a discontinuous reception (DRX) configuration. The determination of the starting location may be in accordance with a location of the slot of the DCI configured to trigger the upper limits.

In decoding, the wireless communication device may identify or determine an aggregation level (AL) and corresponding PDCCH candidates for the target search space (SS). The aggregation level may refer or correspond to a number of CCEs allocated for a PDCCH. For example, the aggregation level may measure the number of resource elements (e.g., in a CORESET) to carry a PDDCH (e.g., a PDCCH DCI message). To determine the AL, the wireless communication device may identify or determine the target SS. The determination of the target SS may be in accordance with the higher layer configuration, an indication in the DCI, or a defined setting (e.g., a default setting, an only setting, a defined or predefined setting, a specified setting of a set of settings).

In some embodiments, the wireless communication device may determine the AL and the corresponding PDCCH candidates for the target SS from a plurality of selections. In some embodiments, the determination may be in accordance with an indication in the DCI. The DCI may specify or define the AL and the corresponding PDCCH for the target SS. In some embodiments, the determination may be in accordance with a RRC signaling. In some embodiments, the determination may be in accordance with a baseline AL. The baseline AL may correspond to an average number of ALs, a mode, median, mode, or variance in the ALs, or as indicated in DCI. In some embodiments, the determination may be in accordance with the higher layer configuration (e.g., RRC, DCI, or default). In some embodiments, the determination may be in accordance with a defined setting (e.g., a default setting, an only setting, a predefined setting, a specified or predefined one of a set of settings).

In determining the AL and corresponding PDCCH candidates or the target SS, the wireless communication device may identify or determine any number of ALs and corresponding PDCCH candidates. In some embodiments, the wireless communication device may determine one AL. In some embodiments, the wireless communication device may determine one AL and candidate (e.g., PDCCH candidates) that correspond to the one AL. In some embodiments, the wireless communication device may determine at least two ALs. In some embodiments, the wireless communication device may determine at least two ALs and candidates corresponding to the two ALs.

In some embodiments, the wireless communication device may identify or determine the AL in one slot based on the identification of the AL set in another slot. Each of the slots may corresponds to or may be a PDCCH occasion slot, a target slot, one of the slots in the limit duration, or any slot, among others. In some embodiments, the wireless communication device may detect the DCI with the AL set in a first slot. In response to the detection of the DCI, the wireless communication device may determine an AL of the second slot with the AL set detected in the first slot. In some embodiments, the wireless communication device may identify or determine the AL or upper limits in one slot in relation to the DCI identified from another slot. In some embodiments, the wireless communication device may decode the first slot and monitor the first slot using a number of DCI size types or DCI formats. In some embodiments, the wireless communication device may determine the AL or upper limits in the second slot in relation to the number of DCI size types or DCI formats from the first slot.

The wireless communication device may identify or determine whether to fallback conditions are satisfied (335). The fallback conditions may define or specify contexts or scenarios in which legacy values are to be used instead of non-legacy values for the upper limits in PDCCH monitoring. The fallback conditions may be associated with upper limits with the legacy values triggered or indicated by the DCI received from the wireless communication node. When the fallback conditions are triggered, the wireless communication device may decode the control channel using legacy limits for PDCCH monitoring. Otherwise, when the fallback conditions are not triggered, the wireless communication device may continue to decode the control channel using non-legacy limits for PDCCH monitoring.

The triggering or the indication of the upper limits with the legacy limits may be similar to the triggering or the indication of the upper limits with non-legacy limits as discussed above, and may be in accordance with any number of factors. In some embodiments, the triggering or the indication may be via one or more states in a field of the DCI or a media access control, control element (MAC-CE). The field in the DCI or MAC-CE may indicate whether to the fallback (e.g., use of legacy limits for PDCCH monitoring) is to be triggered. In some embodiments, the triggering or the indication may be via one or more bits of the DCI or the MAC CE. The bits in the DCI or MAC-CE may indicate whether the fallback is to be triggered. In some embodiments, the triggering or the indication may be via an end of a PDSCH or an associated acknowledge (ACK) or negative acknowledge (NACK). When the PDSCH ends (e.g., indicated by the ACK or NACK), the wireless communication device may determine the triggering of the legacy limits.

In some embodiments, the triggering or the indication may be via the DCI correspond to a DCI for a group of wireless communication devices (UE group DCI) or a DCI for the wireless communication device. The DCI activating the non-legacy limits may for a UE group that includes the wireless communication device, and the DCI deactivating the non-legacy limits may be a UE-specific DCI that corresponds to the wireless communication device. In some embodiments, the triggering or the indication of the legacy limits may be via an expiration of a timer. The timer may keep track of the PDCCH monitoring in one or more slots. In some embodiments, the triggering or the indication of the legacy limits may be via a defined DCI format. The DCI may be in accordance with various formats (e.g., 1-x, 0-x, or 2-x), and one or more of the formats may be used to trigger or indicate the upper limits for PDCCH monitoring.

In some embodiments, the triggering or the indication of the legacy limits may be via at least a portion of the DCI scrambled by a CS-RNTI or a defined RNTI. The portion of the DCI may correspond to cyclic redundancy check portion, and may be scrambled to trigger or indicate the upper limits. The RNTI may be defined or newly defined, and may correspond to the wireless communication device. In some embodiments, the triggering or the indication of the legacy limits may be via a PDCCH, such as a downlink (DL) semi-persistent scheduling (SPS) assignment PDCCH or an uplink (UL) grant type 2 PDCCH, among others. In some embodiments, the triggering or the indication of the legacy limits may be via a defined AL. Upon detection at least one of the defined ALs for triggering, the wireless communication device may enter fallback and trigger legacy limits for PDCCH monitoring. In some embodiments, the triggering or the indication may be via a defined condition.

The wireless communication device may decode control channel using legacy limits (340). The wireless communication device may decode at least one PDDCH in at least one slot in accordance with the upper limits set at legacy values. The decoding of the PDDCH using the upper limits set to the legacy values may be similar to the decoding using upper limits set to the non-legacy values, except for the use of different values. The decoding of the control channel using legacy limits may be performed when the legacy limits are determined to be applied or in response to triggering fallback conditions.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
    receiving, by a wireless communication device from a wireless communication node, a higher layer configuration;
    receiving, by the wireless communication device from the wireless communication node, based on the higher layer configuration, downlink control information (DCI) configured to trigger upper limits for physical downlink control channel (PDCCH) monitoring, wherein the upper limits for PDCCH monitor comprises a maximum number of PDCCH candidates to be monitored in one or more slots (M-PDDCH);
    determining, by the wireless communication device, a starting location to apply the upper limits, according to an application delay or a location of a slot of the DCI configured to trigger the upper limits; and
    decoding, by the wireless communication device, at least one PDDCH in at least one slot according to the upper limits within a time duration corresponding to a limit duration.

2. The method of claim 1, wherein the upper limits for PDCCH monitoring comprises a maximum number of non-overlapping control channel elements (CCEs) in one or more slots (M-CCE).

3. The method of claim 2, wherein the upper limits comprise:
    legacy limits;
    non-legacy limits;
    having the M-PDDCH set to 0; or
    having the M-CCE set to 0.

4. The method of claim 1, wherein to trigger the upper limits includes to indicate the upper limits.

5. The method of claim 1, wherein the DCI is configured to trigger the upper limits via at least one of:
    the DCI having a new or defined DCI format,
    the DCI being scrambled by a configured scheduling radio network temporary identifier (CS-RNTI),
    a downlink (DL) semi-persistent scheduling (SPS) assignment PDCCH or a configured uplink (UL) grant Type 2 PDCCH,
    the DCI being scrambled by a defined RNTI,
    the DCI being a DCI for a group of wireless communication devices that includes the wireless communication device,
    N bits in the DCI, where N is greater than or equal to 1,
    a field in the DCI,
    the DCI being a defined DCI, or
    receipt of any DCI,
    wherein the N bits indicate one or more legacy limits, or one or more non-legacy limits.

6. The method of claim 1, wherein the wireless communication device is configured to be triggered by the DCI on the upper limits, according to:
    the higher layer configuration of a parameter, or the parameter enabling a feature associated with the upper limits.

7. The method of claim 2, wherein the upper limits comprises:
    one or more values for the M-PDDCH or the M-CCE for each subcarrier spacing (SCS); or
    a range of values for the M-PDDCH or the M-CCE for each SCS.

8. The method of claim 1, comprising:
    decoding, by the wireless communication device, the at least one PDDCH, after a time duration corresponding to the application delay, or after the slot of the DCI with the application delay being equal to zero time unit or being absent.

9. The method of claim 1, comprising:
    determining, by the wireless communication device, the application delay according to at least one of: parameters of the higher layer configuration, defined parameters, a numerology of at least one of a physical downlink shared channel (PDSCH) or a PDDCH, or a bandwidth part (BWP).

10. The method of claim 1, comprising:
    determining, by the wireless communication device, the limit duration according to at least one of: a defined timer, a defined value, the higher layer configuration, an indication of the DCI, a defined duration relative to one or more channels, or a discontinuous reception (DRX) configuration.

11. The method of claim 1, wherein the upper limits are triggered or indicated via at least one of:
    one or more states in a field of the DCI or a medium access control control element (MAC CE),
    one or more bits of the DCI or the MAC CE,
    expiration of a limit duration,
    end of a physical downlink shared channel (PDSCH) or an associated acknowledgement or negative acknowledgement (ACK/NACK),
    the DCI being a DCI for a group of wireless communication devices, or being a DCI for the wireless communication device,
    expiration of a timer,
    a defined DCI format,
    the DCI being scrambled by a configured scheduling radio network temporary identifier (CS-RNTI),
    a downlink (DL) semi-persistent scheduling (SPS) assignment PDCCH or a configured uplink (UL) grant Type 2 PDCCH,
    the DCI being scrambled by a defined radio network temporary identifier (RNTI),
    a defined aggregation level (AL), or
    a defined condition.

12. The method of claim 1, comprising:
determining, by the wireless communication device, an aggregation level (AL) and corresponding PDCCH candidates for a target search space (SS).

13. The method of claim 12, comprising:
determining, by the wireless communication device, the target SS according to the higher layer configuration, an indication of the DCI, or a defined setting.

14. The method of claim 12, comprising:
determining, by the wireless communication device, the AL and the corresponding PDCCH candidates for the target SS, from a plurality of selections, according to:
an indication in the DCI,
a radio resource control (RRC) signaling,
a baseline AL,
the higher layer configuration, or
a defined setting.

15. The method of claim 12,
wherein determining the AL and the corresponding PDCCH candidates for the target SS comprises:
determining, by the wireless communication device,
one AL;
at least two ALs;
one AL and candidates corresponding to the one AL; or
at least two ALs and candidates corresponding to the two ALs; or
wherein the limit duration is defined according to a number of slots, millisecond, PDCCH monitoring occasions, or PDCCH monitoring occasions for a search space (SS), or according to a timer.

16. The method of claim 1, comprising:
according to the wireless communication device detecting the DCI with an aggregation level (AL) set in a first slot, and
determining, by the wireless communication device with the AL set, an aggregation level of a second slot.

17. The method of claim 1, comprising:
according to the wireless communication device decoding a first slot and monitoring the first slot with a number of DCI size types or DCI formats, and
determining, by the wireless communication device in relation to the number of DCI size types or DCI formats, an aggregation level or upper limits of a second slot.

18. A wireless communication device comprising:
at least one processor coupled with memory, configured to:
receive, via a receiver from a wireless communication node, a higher layer configuration;
receive, via the receiver from the wireless communication node, based on the higher layer configuration, downlink control information (DCI) configured to trigger upper limits for physical downlink control channel (PDCCH) monitoring, wherein the upper limits for PDCCH monitor comprises a maximum number of PDCCH candidates to be monitored in one or more slots M-PDDCH);
determine a starting location to apply the upper limits, according to an application delay or a location of a slot of the DCI configured to trigger the upper limits; and
decode at least one PDDCH in at least one slot according to the upper limits within a time duration corresponding to a limit duration.

19. A method, comprising:
sending, by a wireless communication node to a wireless communication device, a higher layer configuration;
sending, by the wireless communication node to the wireless communication device, based on the higher layer configuration, downlink control information (DCI) configured to trigger upper limits for physical downlink control channel (PDCCH) monitoring, wherein the upper limits for PDCCH monitor comprises a maximum number of PDCCH candidates to be monitored in one or more slots (M-PDDCH);
causing the wireless communication device to determine a starting location to apply the upper limits, according to an application delay or a location of a slot of the DCI configured to trigger the upper limits; and
causing the wireless communication device to decode at least one PDDCH in at least one slot according to the upper limits within a time duration corresponding to a limit duration.

* * * * *